May 27, 1941.   K. KOEHL   2,243,160
PROJECTION APPARATUS
Filed March 31, 1938   4 Sheets-Sheet 3

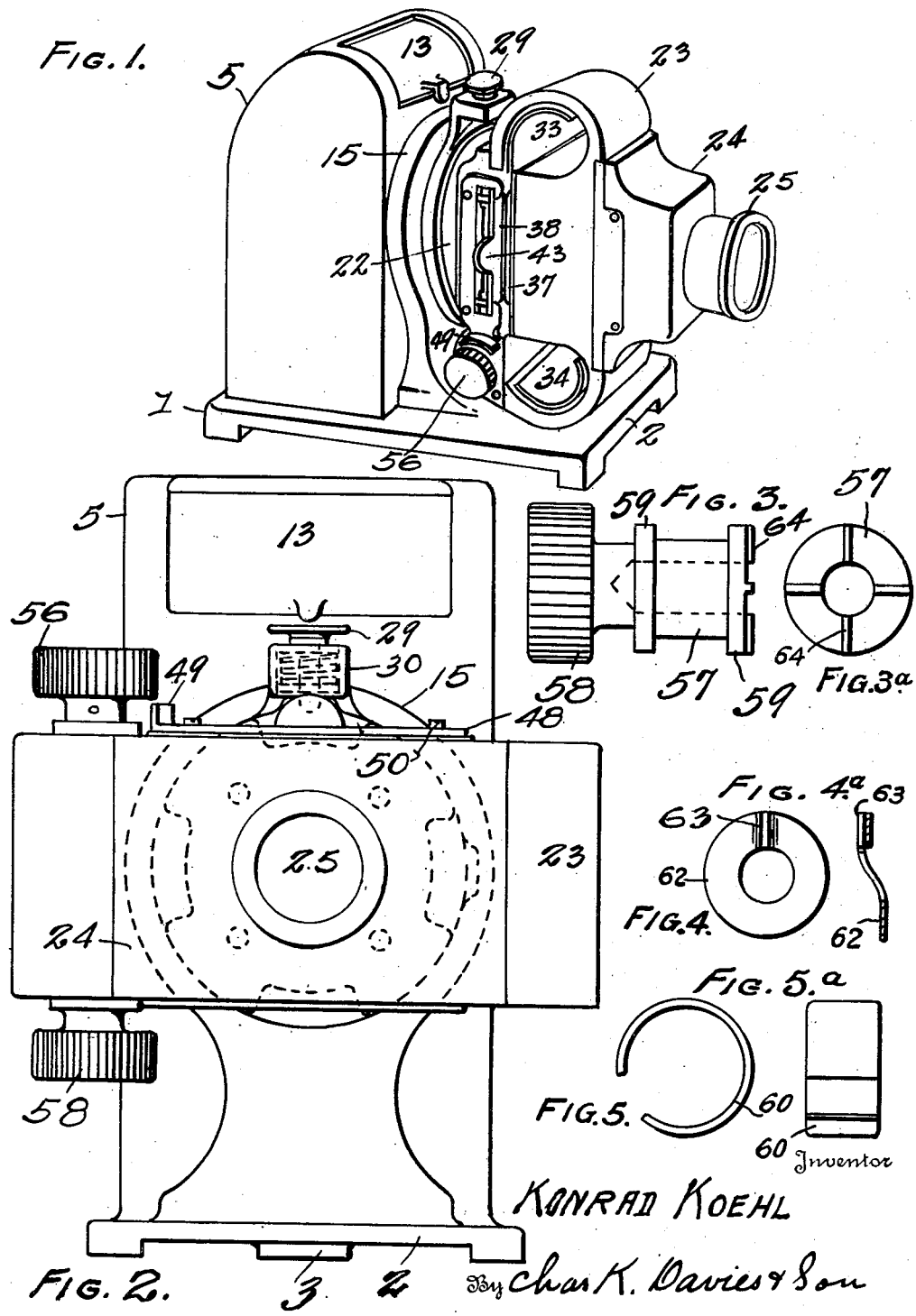

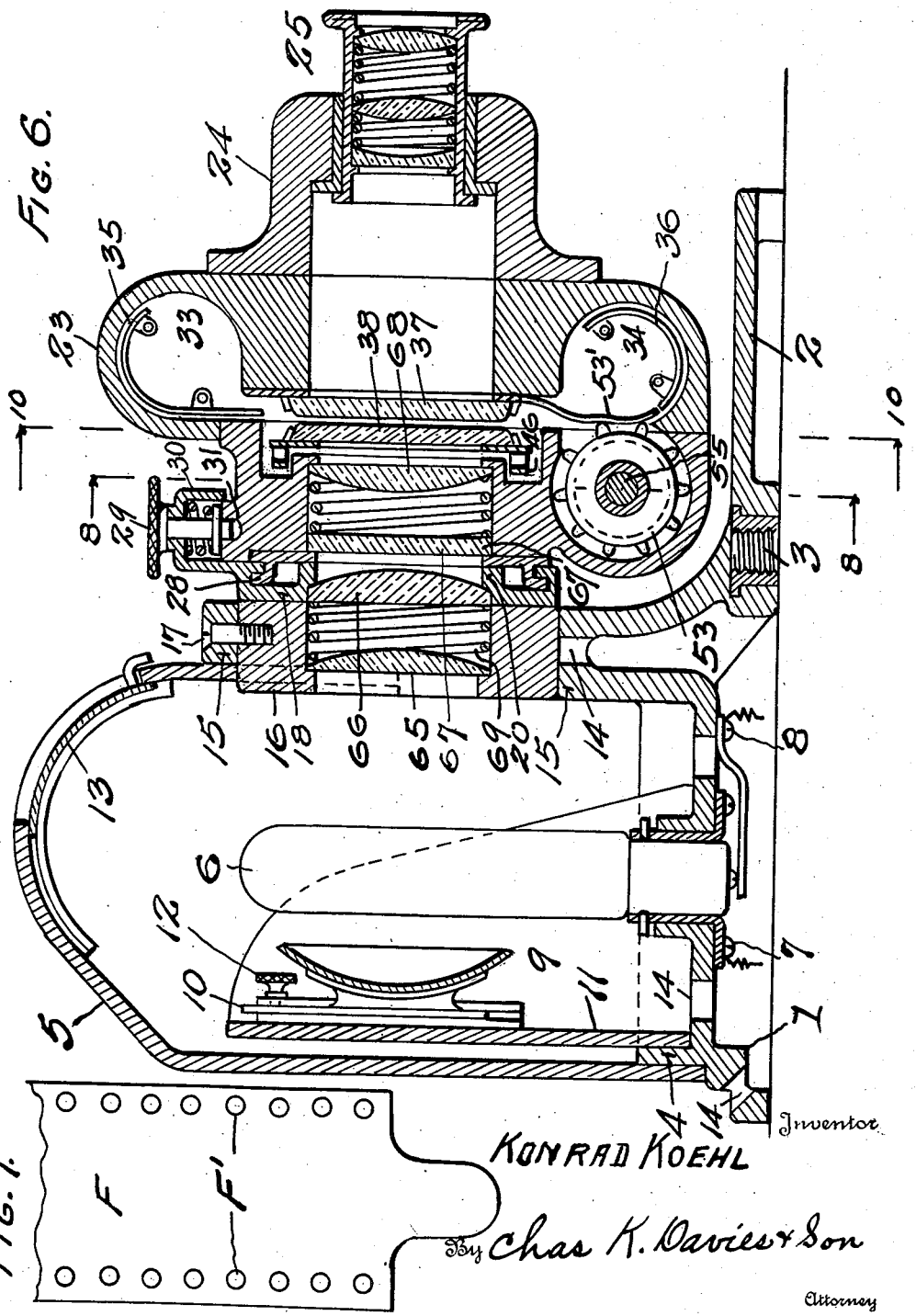

Inventor
KONRAD KOEHL
By Chas K. Davies & Son
Attorney

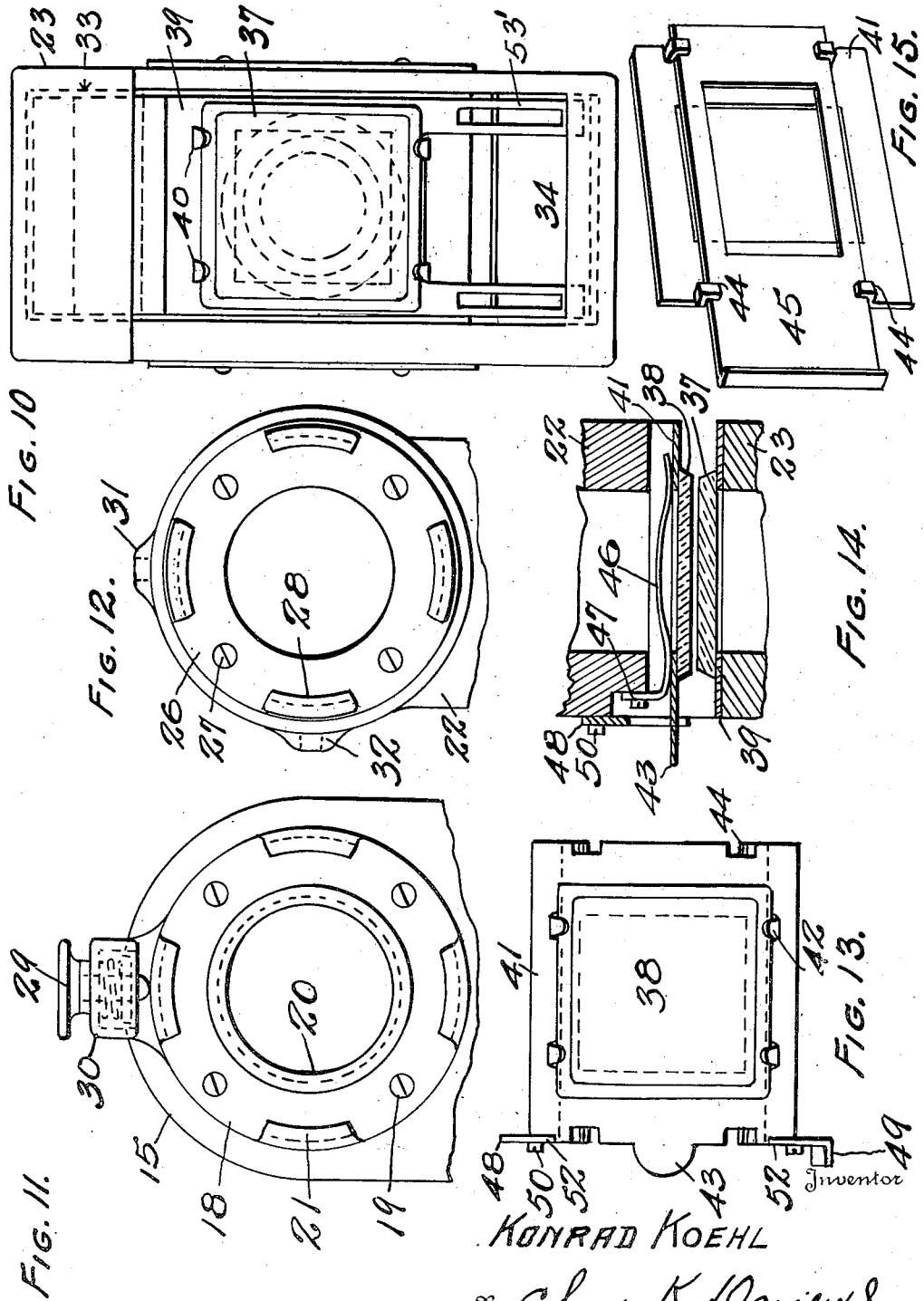

Patented May 27, 1941

2,243,160

UNITED STATES PATENT OFFICE 2,243,160

PROJECTION APPARATUS

Konrad Koehl, Dresden, Germany, assignor to Ihagee Kamerawerk Steenbergen & Company, Dresden, Germany Application March 31, 1938, Serial No. 199,296

7 Claims. (Cl. 88—17)

The present invention relates to an improved projection apparatus or a portable projector, for projecting and displaying images of objects, real pictures, or photographs, from a film-strip, or a plate, upon a screen or other suitable surface, and in enlarged or magnified form. As herein illustrated I preferably employ a direct positive miniature photographic film having the usual series of perforations along its lateral edges; and means are provided for intermittently feeding or advancing the film picture by picture for single image projections; and interconnected means are also provided for advancing or feeding the film-strip continuously for a continuous projection of the successive pictures.

In the use of projection apparatus of this character it is customary for the operator of the projector to work in the dark, thus rendering it a difficult matter to correctly insert the film-strip, or to change film-strips when necessary. To overcome this difficulty I provide means whereby a demountable portion of the apparatus may with facility be removed; or if desired the guiding means for the film-strip may be removed; and the film-strips exchanged for the insertion of a fresh strip; after which the detached or removed portion of the apparatus with the fresh film-strip may with equal facility be restored to operative position as a part of the apparatus.

The projector thus includes a rotatively adjustable and demountable front part that contains the winding mechanism for the film-strip, a portion of the condenser system, and the objective lenses; and this demountable front is also rotatively adjustable angularly of the stationary portion of the projector and also of the display screen to bring the film-strip into either vertical or horizontal position.

It sometimes occurs that a single picture in a film-strip bearing a series of pictures has been taken upside down and consequently the single picture is out of position with relation to the remaining pictures on the strip. Under such conditions it is not necessary to remove the film-strip from the projector, but the adjustable front part of the projector in which the film is mounted may readily be turned through one hundred and eighty degrees for display of the single picture, after which the front part of the projector may conveniently be turned for restoration to its original position. If necessary, of course, the demountable and rotatively adjustable front part of the projector may be turned through a complete cycle of three hundred and sixty degrees.

Because of the high degree of light output of which the projector is capable, it is especially adapted for the projection of color film-strips, as well as for use with rectangular glass slides.

The invention consists in certain novel combinations and arrangements of parts of the projector as will hereinafter be more fully set forth and claimed. In the accompanying drawings I have illustrated one complete example of the physical embodiment of the invention in which the parts are combined and arranged according to one mode thus far devised for the practical application of the principles of the invention, but it will be understood that changes and alterations are contemplated and may be made in the structures exemplified in the drawings, within the scope of the appended claims, without departing from the principles of the invention.

Figure 1 is a perspective view of a portable projector embodying the invention, with the film in upright position.

Figure 2 is an enlarged front elevation of the projector with the adjustable front turned through an angle of ninety degrees from the position of Figure 1, and with the strip in horizontal position to move transversely of the apparatus.

Figure 3 shows a side view and Figure 3a shows an end view of the operating knob or rotary head which advances or feeds the film-strip intermittently.

Figure 4 is a face view and Figure 4a is a sectional view of the clutch disk that co-operates with the rotary head or knob of Figure 3.

Figure 5 is an edge view and Figure 5a is a side view of the split resilient brake-band or friction ring which retains the rotary knob of Figure 3 against turning when the film-strip is being continuously advanced.

Figure 6 is a central vertical longitudinal sectional view of the projector in the upright position of Figure 1.

Figure 7 illustrates in a conventional way a portion of the positive or direct photographic strip made from a miniature camera and employed in the projector.

Figure 10 is a view, as at line 10—10 of Figure 6 looking at the face or inner parts of the film-housing, and showing the front guide plate for the film strip.

Figure 11 shows the stationary fastening plate of the demountable head of the projector, and Figure 12 shows the complementary fastening plate of the demountable head.

Figure 13 is a face view of the rear presser plate or guide plate for the film.

Figure 14 is a horizontal sectional view of the two film guide-plates, and showing especially one of the springs or resilient blades for the presser plate of the guide device.

Figure 15 is a perspective view showing the frame of the rear presser plate equipped with a vignette plate for reforming the projection aperture.

Figure 9:
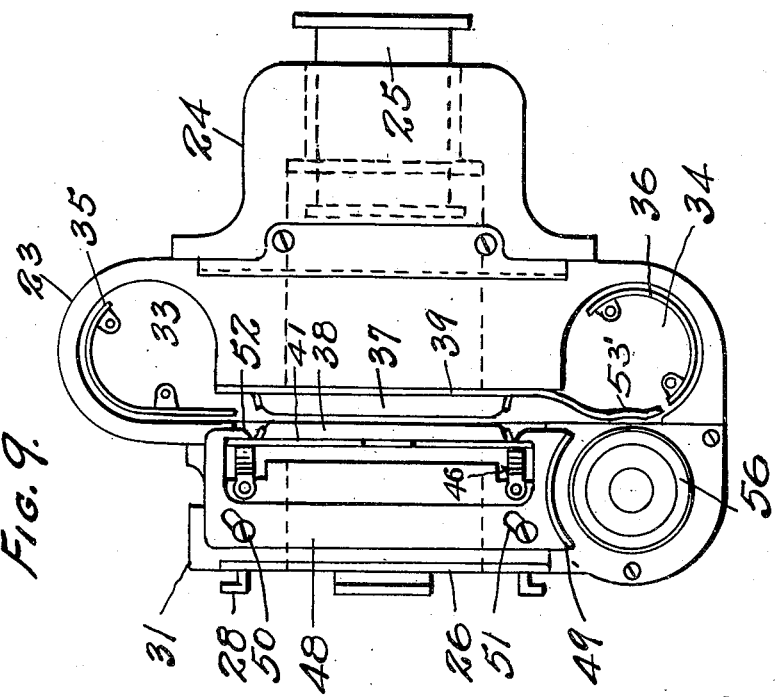
Figure 9 is a side view of the rotary, adjustable, demountable head of the projector that includes the housings for the condenser system, the film and its feeding mechanism, and the photographic objective or lenses.
Figure 8:
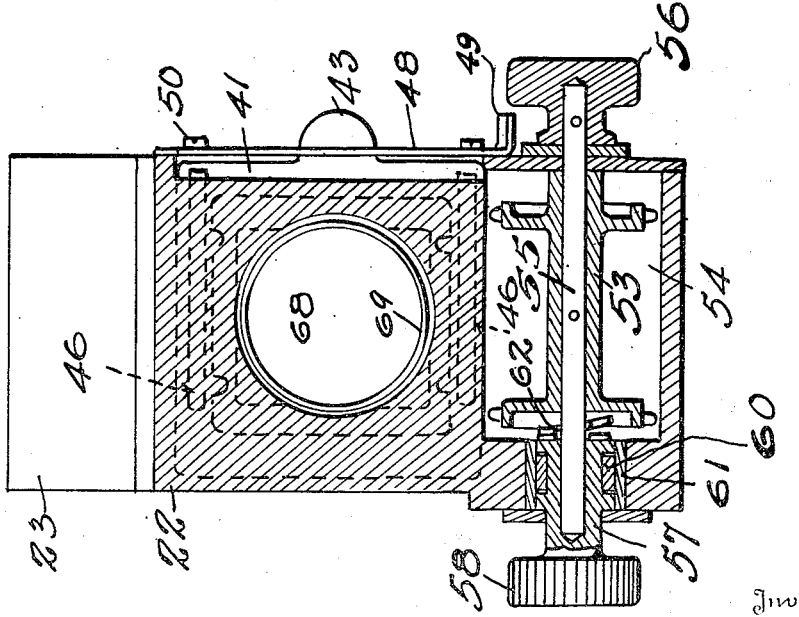
Figure 8 is a transverse vertical sectional view at line 8—8 of Figure 6 showing the rotary knobs for advancing the film with either an intermittent feed or a continuous feed.

In Fig. 7 a portion of a well known type of miniature film strip is indicated as F and provided with the conventional perforations F' arranged along the lateral edges of the strip, and this strip is employed in the projector for display of its pictures. A standard type of glass or transparent slides may be substituted in lieu of the film strip, if desired, and under the latter circumstances the film feeding or advancing mechanism is not used.

The projector illustrated in the drawings is of the portable type, and its parts are compactly arranged in order to occupy a minimum of space, while at the same time the parts are readily separable in order to give access to the interior of the projector for assembling, cleaning, and adjusting the parts.

In the preferred form of the invention I employ a stationary body and a rotatively adjustable head demountably connected therewith, and the projector, with its apertures alined along the optical axis also includes the axially alined mirror, lamp, a triple condenser, film guide disposed transversely of the projection aperture, and a photographic objective or series of lenses, by means of which the images on the film are projected and enlarged or magnified.

The stationary body portion of the projector includes a substantial base 1 and integral shelf 2, and this body portion is constructed and fashioned in suitable manner from appropriate material. The body may be supported on a table or other object, and a threaded nut 3 is illustrated in Figure 6 by means of which the projector may be mounted on a threaded bolt or stud of a tripod or similar stand. The base 1 is fashioned with an upper, integral flange 4 upon which the lamp housing 5 is mounted and secured in suitable manner, and the lamp or projection bulb 6 is supported as usual in a socket within the base 1, with the electric terminals 7 and 8 connected to a convenient source of electrical energy for lighting the lamp with a comparatively high candle power.

At the rear of the lamp and within the lamp housing is mounted a vertically adjustable concave reflecting mirror 9, having a bracket 10 that is adjustable on the mirror support 11, and a set screw 12 is illustrated, as one means for adjusting the mirror and retaining it in proper relation to the lamp and the optical axis of the projector.

In the upper front portion of the lamp housing an opening is provided for access to the interior of the housing, and this opening is closed by a slide door 13 to prevent exterior radiation of light rays from the lamp.

In order to prevent excessive heating of the interior of the projector that would otherwise extend to the condensers, film, and other interior parts of the projector; and also to permit the use of a lamp of comparatively high candlepower; I provide means for venting the interior of the lamp housing, by the use of holes as 14 in the base-walls that permit circulation of air to and from the interior of the housing. The vent holes are arranged or located to permit access of fresh cool air to the heated parts, but at the same time also to prevent egress of light from the lamp housing.

Between the base on which the lamp housing is supported and the front shelf 2 of the body of the projector I arrange an integral upright, transversely extending support or flange 15 having a circular aperture centered on the optical axis of the projector, and within this flange is rigidly mounted an annular attaching collar 16 which is secured to the exterior flange 15 in suitable manner, as by means of a set screw 17 in Figure 6.

This annular collar 16 forms a part of the stationary part of the projector and it is equipped with an attaching plate 18, as best seen in Figure 11, which is fixed to the collar by means of screws 19. The attaching plate is fashioned with a central aperture and a concentric front flange 20, and this plate is also fashioned with a suitable number of attaching lugs 21 circumferentially spaced and located at the outer periphery of the plate, the lugs forming grooves open at their inner sides. This attaching plate and its lugs form the stationary part of a quick-acting joint between the stationary body of the projector and the demountable and rotatively adjustable head of the projector, as will be described.

The demountable head comprises three rigidly joined sections that may readily be separated for assembling, cleaning and adjusting parts, and these three sections are indicated as 22 for the combined gear casing and condenser housing; 23, for the film housing; and 24 for the housing or mounting of the photographic objective lenses 25 mounted at the front of the housing 24.

In Figure 12 the quick-acting means mounted on the demountable head for joint use with the plate 18 and lugs 21 of the body or stationary part of the projector, comprises an attaching plate 26 having a central aperture, and attached to the head-section 22 by screws 27, and this plate 26 is fashioned with complementary lugs 28 having exterior grooves.

The combination and joint use of these two attaching plates provides a simple and easily operated locking joint by means of which the head may be locked to the body by a simple turn of the head, and with equal facility the head may be turned slightly to disengage the locked lugs 21 and 28 for the purpose of demounting the head entirely, or for the purpose of angularly adjusting the head with relation to the body and the screen.

The locking lugs 21 and 28, or other quick-acting locking means, may co-operate with one another as to retain the locked position by means of friction, but for a positive retaining device to hold the head in adjusted position, I provide co-acting means on the stationary body and the adjustable head. Such a retaining device may include a spring pressed pin 29 mounted on the plate 18 through the use of a housing 30 rigid with the plate, and the housing-section 22 may be provided with two or more angularly spaced peripheral sockets 31 and 32 to receive the pin. The pin may readily be released from its socket by an upward movement of lift of the pin-head, and it automatically returns to the socket to center the head and retain it in adjusted position.

Thus in Figure 2, the pin is engaged in the socket 32 to hold the head in adjusted horizontal or transverse position, while in the other figures of the drawings the pin is engaged in socket 31 to retain the adjusted head in vertical or upright position. After the spring-pressed pin is withdrawn from its socket, by a slight turn of the head, the latter may be readily demounted, as for instance for the purpose of exchanging films, inserting a fresh film, or for inverting the head to take care of an inverted picture on the film strip, and in the latter instance especially no perceptible loss of time is occasioned.

The four pairs of locking lugs are arranged and related in such manner as to provide for four different positions of the adjustable head, and means are provided for retaining the head in any of these adjusted positions, but it will be understood that changes and alterations may be made in the quick-acting joint so that the head may with facility be demounted or adjusted to suit various conditions in the use of the projector.

The section 23 forming the apertured film housing is provided with spaced compartments 33 and 34 at opposite sides of the optical axis of the projector, and it will be understood that the strip may be deposited in compartment 33 and fed with a pull across the projection aperture, or the film may be deposited in compartment 34 and fed with a push across the aperture and then coiled in compartment 33. For convenience of illustration I shall refer to the feed or advance movement of the film strip from a coil in compartment 33, across the projection aperture or optical axis of the projector, by means of a pull imparted by the feed mechanism, and the advancing film is coiled within the compartment 34.

For convenience in uncoiling the film roll in compartment or pocket 33, a curved guide 35 may be located within the pocket, and for convenience in directing the leading end of the uncoiled film strip into the coiling pocket 34, a similar curved guide flange 36 may be employed in the receiving pocket.

In the projection aperture of the head are mounted two transversely extending guide plates 37 and 38, of glass or other transparent material, between which the film-strip is passed by action of the feed mechanism. The front guide plate 37 is mounted on an apertured frame 39 (Figure 10) by means of securing lugs 40, and this frame with its plate is mounted on the inner face of the housing-section 23 of the head.

The guide plate 38 is a resiliently supported presser plate which as best seen in Figure 13 is mounted on the apertured frame 41 by means of retaining lugs 42, and this frame has a handle-lug 43 that is accessible from the exterior of the head for use in manipulating the plate. The recess in the face of the housing 22, about the exposure-projection aperture, is also adapted to receive and retain a standard type of picture-slide, and as the presser-plate 38—41 (except for the handle 43) is of substantially the same size and shape as the picture-slide, the latter may readily be substituted after removal of the presser-plate, for projection of the picture on the picture-slide. The presser plate is urged toward the plate 37 by means of two spring blades 46 located in recesses of the housing 22 and spaced above and below the projection aperture of the head. One end of each of these springs is attached as by screw 47 to the housing 22, and the spring blades are bent or flexed to project transversely of the head in the recessed housing, and as before stated they urge the presser plate toward the film strip to be passed between the two plates.

In Figure 15 it will be seen that the frame 41 is also provided with two pairs of bent lugs 44 (see the edges of plate or frame 41 in Fig. 13) and in some instances a vignette plate 45 may be mounted on the frame by means of these lugs.

In connection with the resilient presser guide plate 38 and its frame 41 I employ a film-releasing slide plate 48 located on the exterior of the section 22 of the head, and adapted to move the guide plate 38 away from the complementary guide plate 27 and thereby free the film from close contact with the two plates. This release of the film strip is desirable to prevent marring, especially while the film is being advanced or fed between the plates, and for this purpose the slide plate 48 is provided with a thumb piece or finger piece or flange 49 in close proximity to the operating knob 56 by means of which the film is advanced or fed with a continuous movement. The slide plate is retained on the head by screws 50 and the plate is slotted at 51 to accommodate the screws, and the plate is fashioned with spaced hooks 52 that engage over an edge of the frame 41. Thus, in Figure 9 it will be seen that the thumb may press on the flange 49 to retract the presser plate against the tension of the spring blades 46 and thus free the film strip, while at the same time a fore finger may be employed to turn the knob 56 for feeding or advancing the film strip while it is freed.

The knob 56 forms part of the film feeding mechanism, and this mechanism includes a rotary, toothed drum 53 located in a chamber 54 of the housing-section 22, and the toothed drum cooperates with a pair of slotted guide legs or tongues 53' (Figure 10) that depend from the frame 39, to pass the film strip into the compartment or pocket 34.

The drum is fixed on the shaft 55 journaled in section 22, and the manually turned knob 56 is also fixed to the shaft, but exterior of the head, so that by turning the knob 56 a continuous motion may be imparted to the film strip for a continuous succession of projections of pictures.

The end of the shaft opposite to the end on which the knob 56 is fixed, is journaled to turn freely in a hub 57 journaled in a wall of the section 22, and another operating knob 58 is formed integrally with this hub and located exterior of the head. This knob 58 is employed to impart an intermittent rotation to the drum and a picture by picture movement or advance to the film strip for the successive projection of single pictures, and it will be understood that the knob 58 remains idle while knob 56 is being turned, and knob 56 turns with the turning of knob 58.

The hub 57 is fashioned with spaced exterior flanges 59 and between the flanges is interposed a split resilient band or bearing ring 60, the hub-flanges and collar being journaled in the fixed bearing 61 in the wall of the housing 22. The split bearing ring 60, due to its frictional engagement with the hub and the bearing 61 holds the knob 58 against turning when the knob 56 and shaft are turned.

For imparting the picture by picture movement to the film strip by turning the knob 58 I employ a clutch arrangement between the hub 57 and the drum, which includes a resilient clutch disk 62 having a central opening and mounted between the end of the hub and one end of the drum. This clutch disk, as best seen in Figures 4 and 4a has a radially extending dent 63 that provides a groove adjoining the end or face of the hub, and the latter has a number of complementary radial teeth 64 any one of which is designed to fit into the groove of the dent or depression. As the knob 58 is turned by hand the tension of the split resilient ring is overcome, and the rotating knob and hub cause the flexible and resilient disk to clutch the hub and drum, thus turning the drum.

For the intermittent or picture by picture feed of the film, the drum is provided with spur teeth to the number required for advancing the film strip one picture with each turn of the knob 58, and the clutch disk 62 is turned or rotated with each rotation of the knob 58 and then the radial tooth 64 is released from the groove or dent 63. The next turn of the knob causes the next tooth 64 to engage the clutch disk-groove 63 and following this turn of the drum, the latter is again released, thus accomplishing the intermittent operation of the clutch and the picture by picture advance or feed of the film strip.

In the initial adjustment of the film strip, the knob 56 is employed to center the first picture in the projection aperture, and thereafter the intermittent feed is accomplished by the knob 58, each successive picture being properly centered in the projection aperture.

A triple condenser forms part of the projection system and comprises the rear lens 65 and intermediate lens 66 located within the projection aperture of the fixed portion of the optical axis of the projector, and a heat screen or diaphragm 67 with the spaced front lens 68 are located in the projection aperture of the demountable head. The lenses and screen are interposed between the lamp and the film guides or plates 37—38 along the optical axis of the projector and these elements are spaced by springs 69 and retained by suitable flanges on the parts in which they are mounted. The heat absorbing filter or screen 67 aids in preventing access of heat from the lamp housing to the film, and as indicated at 14' in Figure 6, perforations may be provided in parts surrounding the condenser lenses to permit ventilation, or circulation of air about these parts for cooling purposes.

As before stated, the entire demountable head may be detached in order to change films, and in addition, it will be understood that if desired the frames and plates of the film guide-device may be withdrawn from the head and the strip inserted between these parts for replacement in the head.

The compact arrangement of the parts of the projector provide for facile manipulation of the apparatus, and especially the arrangement of the knobs 56 and 58 at opposite sides of the head and on opposite ends of the feed shaft, permit the use of both hands, one on each knob, when the strip is being centered and afterward being fed picture by picture across the projection aperture.

Having thus fully described my invention, what I claim as new and desire to secure by Letters Patent is:

1. The combination in a projector with a stationary guide-plate, a complementary resiliently supported presser plate, and mechanism for feeding a film-strip between said plates, of an exterior slide plate having slots therein arranged diagonally of the presser plate, hooks on the slide plate engaging said presser plate, said mechanism including a rotary head, and a flange at one end of the slide plate adjacent the rotary head, whereby the presser plate is retracted by pressure on said flange.

2. The combination in a projector including a housing having a recessed face about its exposure-projection aperture adapted to receive alternately a picture slide or a laterally removable member, said face also having a pair of parallel transversely extending recesses at opposite sides of the aperture, and a spring-blade mounted in each recess for frictional engagement against the rear face of said member which is in the recess.

3. The combination in a projector having a sectional head including a front lens-mount, a rear condenser housing having a front face with a recess about its exposure-projection aperture, adapted to alternately receive a picture slide and an intermediate film-casing having a fixed guide plate opposite said recess, of a complementary presser-plate mounted in said recess for alternate use with said slide when a film strip is used, and resilient means for urging the presser-plate toward the guide plate.

4. The combination in a projector having a sectional head including a front lens-mount, a rear condenser-housing having a front face with a recess about its exposure-projection aperture, and an intermediate film casing having a fixed guide plate opposite said recess, of a complementary presser-plate mounted in said recess, resilient means for urging the presser-plate toward the guide plate, and means mounted on a lateral exterior face of the condenser-housing and engaging said presser-plate for manual retraction of the presser-plate.

5. The combination in a projector having a sectional head including a front lens-mount, a rear condenser-housing having a front face with a recess about its exposure-projection aperture, and an intermediate film-casing having a fixed guide plate opposite said recess, of a presser-plate mounted in said recess, a retracting slide-plate mounted on an exterior face of the condenser-housing, and means on the slide plate engaging the presser-plate for retraction thereof.

6. The combination in a projector having a sectional head including a front lens-mount, a rear condenser housing having a front face with a recess about its exposure-projection aperture, and an intermediate film casing having a fixed guide plate opposite said recess, of a removable presser plate mounted in the recess, a pair of spaced parallel spring blades mounted on the housing and bearing against the back of the presser-plate, and exterior retracting means mounted on the housing and having retracting engagement with the presser plate.

7. The combination in a projector having a sectional head including a lens mount, a rear condenser housing having a front face with a recess about its exposure-projection aperture, and an intermediate casing, of a removable presser plate mounted in the recess adapted for alternative use with a picture slide, and resilient means urging said presser-plate in the direction of the front of the projector.

KONRAD KOEHL.